Figure 1:
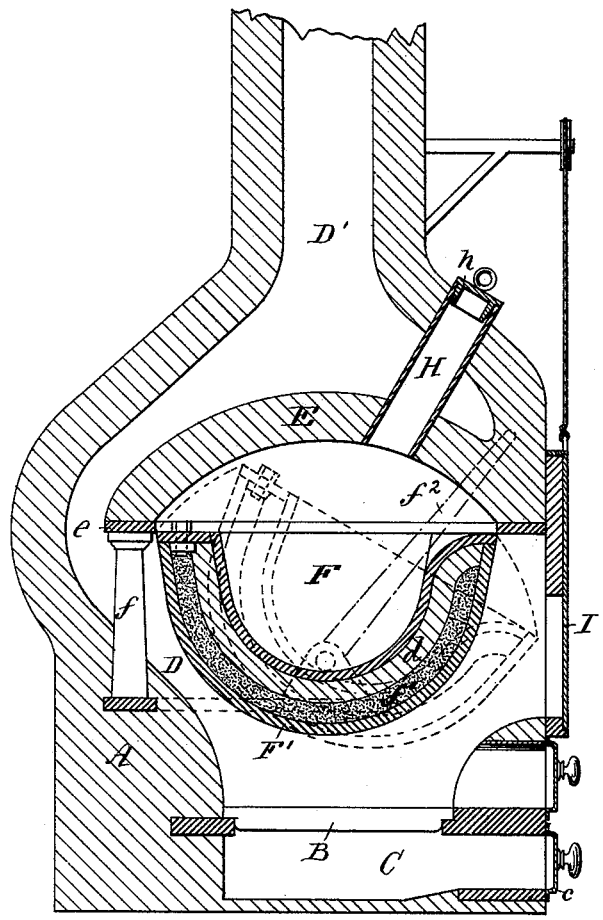

(No Model.)　　　　　　　　　　　　　　　3 Sheets—Sheet 1.
C. PAYEN.
METHOD OF PRODUCING CRYSTALLIZED METAL PLATES.

No. 415,348.　　　　　　　　　Patented Nov. 19, 1889.

WITNESSES:　　　　　　　　　　　　　　　INVENTOR:

(No Model.) 3 Sheets—Sheet 2.
C. PAYEN.
METHOD OF PRODUCING CRYSTALLIZED METAL PLATES.
No. 415,348. Patented Nov. 19, 1889.
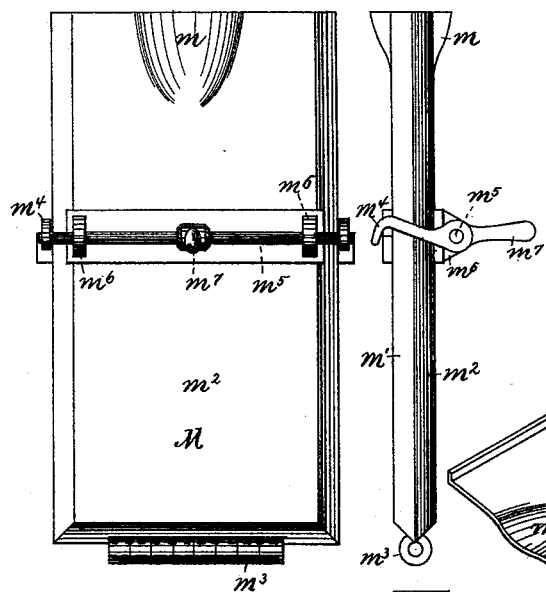
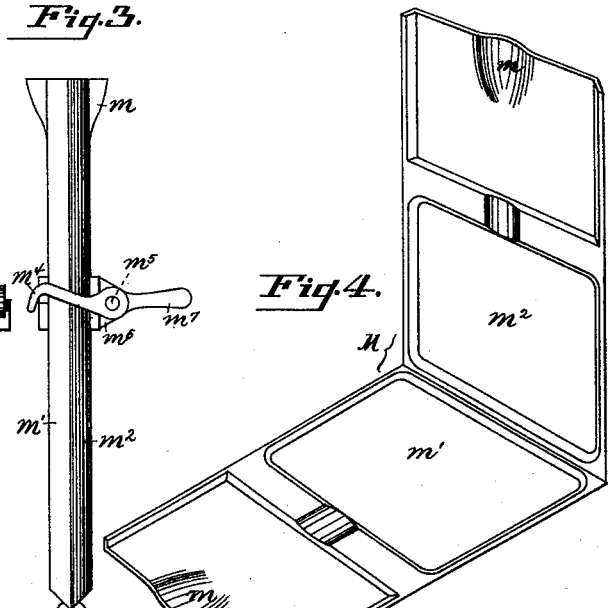
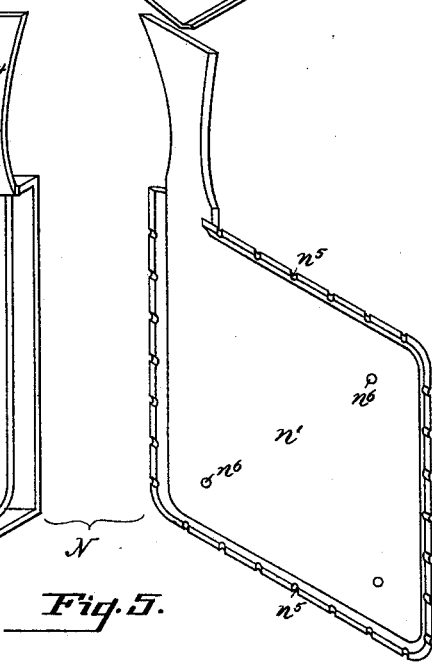
WITNESSES:
INVENTOR:

(No Model.) 3 Sheets—Sheet 3.
C. PAYEN.
METHOD OF PRODUCING CRYSTALLIZED METAL PLATES.
No. 415,348. Patented Nov. 19, 1889.
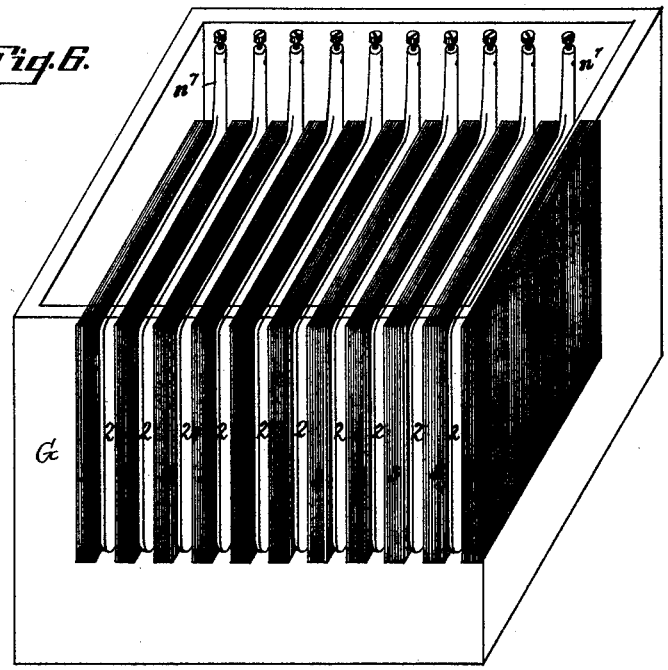
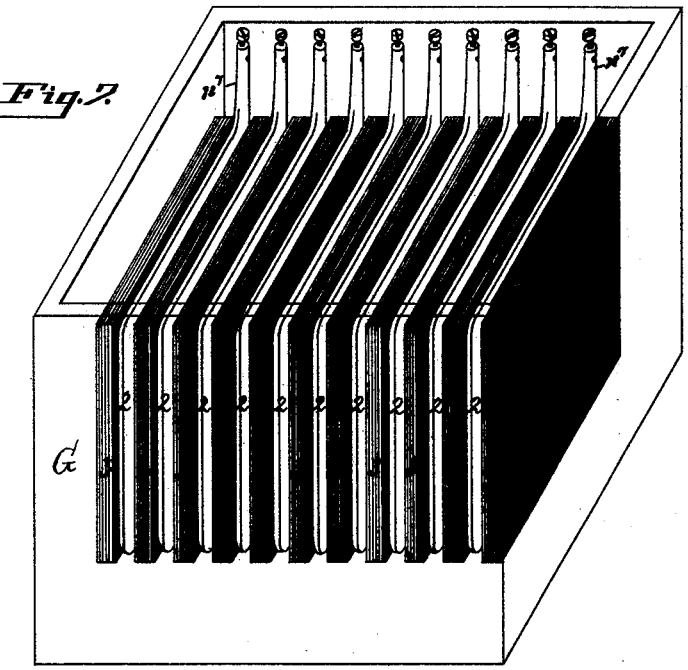
WITNESSES:
Hermann Bormann.
Thomas M. Smith.
INVENTOR:
Clement Payen,
By J. Walter Douglass.
Atty.

UNITED STATES PATENT OFFICE.

CLÉMENT PAYEN, OF PHILADELPHIA, PENNSYLVANIA, ASSIGNOR TO THE ELECTRIC STORAGE BATTERY COMPANY, OF GLOUCESTER CITY, NEW JERSEY.

METHOD OF PRODUCING CRYSTALLIZED METAL PLATES.

SPECIFICATION forming part of Letters Patent No. 415,348, dated November 19, 1889.

Application filed February 14, 1888. Serial No. 263,944. (No specimens.)

*To all whom it may concern:*

Be it known that I, CLÉMENT PAYEN, a citizen of the Republic of France, but now residing at the city of Philadelphia, in the county of Philadelphia and State of Pennsylvania, have invented certain new and useful Improvements in the Method of Producing Crystallized Metallic Plates, &c., of which the following is a specification.
My present invention relates to certain improvements in the method of producing crystallized metal plates, &c., forming the subject-matter of an application for a patent filed by me on the 26th day of July, 1887, and serially numbered 245,378.

The principal object of my invention is to provide a porous crystallized metal plate to form an element of a secondary or storage battery.
My invention consists in fusing with the salt of a metal another salt or a metal or metals or a salt or salts of such metal or metals, then discharging the mass into a mold, wherein it becomes crystallized, then framing the cast plate, then immersing a series of said crystallized plates in a solution in contact with plates composed of metallic zinc, iron, nickel, cobalt, cadmium, or other material with one face of each crystallized or metallic plate coated with paraffine, wax, or other non-conducting substance or material to reduce the crystallized plates to a metallic state with as well foreign material eliminated therefrom, then washing and drying the porous crystallized metal plates, whereby they are brought to their completed condition with substantial strength for use as the elements of a secondary or storage battery.

As the framing step may be carried out as well after reduction of the crystallized plates to a metallic state as before, I do not therefore wish to limit myself to the precise order of conducting the several steps of the process as hereinbefore given.
In the accompanying drawings I have illustrated apparatus for the conduct of my present invention in such forms respectively as I have found practically efficient, and in which—

Figure 1 is a vertical central section through a melting-furnace of my improved construction, showing the crucible pivotally supported therein and operated by a lever for discharging the contents thereof. Fig. 2 is a top or plan view of a mold constructed in two parts hinged to each other, and showing also the means for clamping the same together. Fig. 3 is an end view of said mold. Fig. 4 is a perspective view of said mold in two parts hinged together, and in which crystallization takes place, and showing the interior formation thereof. Fig. 5 is a similar view of the bivalved mold for casting a frame around the crystallized plate detached from each other. Fig. 6 is a perspective view of a vase or canister with a series of crystallized plates, having one face of each coated with paraffine or other non-conducting substance and arranged in contact with a series of metallic zinc or other suitable metallic plates of the same dimension and the two series of plates immersed in a suitable solution for reducing said crystallized plates to a metallic state with the elimination by the chemical action taking place of all extraneous elements, thereby leaving said plates in a crystallized metallic state with porosity; and Fig. 7 is a similar view of a vase with a series of crystallized plates arranged in contact with a series of metallic zinc or other metallic plates, having one face of each coated with paraffine or other analogous material and the two series of plates immersed in a solution for causing the elimination of all foreign elements from the crystallized plates required and the reduction of said plates to a metallic state with porosity.

Referring to the accompanying drawings, A is the furnace, constructed of brick or other material of any suitable form.

B is a grate located and supported in the lower part of the furnace. Beneath the grate B is an ash-pit C, closed from the outside of the furnace by means of a door *c*.

D is a draft-flue leading to the chimney D'.

E is an arch, made of brick or other refractory material, in the upper part of the furnace and supported in position by means of a plate e, with central opening therein. The annular plate e is held in position by means of columns f, arranged and supported in the brick-work of the furnace in any suitable manner.

F is a porcelain crucible or melting-pot open at the top, and around the exterior surface thereof is formed a layer d of amianthus, asbestus, or other suitable material, and between the layer d and the metallic pot F' is a layer of sand f' of any desired thickness.

The metallic pot F' is pivotally supported in a central position within the furnace and is operated from the outside by a lever $f^2$, attached to one of the journals of the metallic pot F', whereby the crucible F may be readily tilted for discharging the contents thereof into a receptacle for further treatment.

H is an inclined hopper provided with a removable stopper h, by which arrangement the material may be readily charged into the crucible F.

I is a sliding door operated in any convenient manner to allow of the discharge of the mass or compound into a suitable mold for causing crystallization to take place therein.

The characteristic features of the melting-furnace having been described, I will now proceed to explain the first step of my process—that of producing a porous crystallized metallic plate of a given size—and for the sake of illustrating my invention I will describe the manner of producing a lead plate of a size varying from six to twelve inches square. I take a charge of chloride of lead, ($PbCl_2$,) and to which I add two per cent., by weight, (more or less,) of chloride of cadmium and two per cent., by weight, (more or less,) of chloride of zinc or of metallic zinc, and these chlorides or metals—namely, the chloride of cadmium and chloride of zinc or metallic zinc—may be added either before or during the fusing of the mass or compound; but I prefer to add the chloride of cadmium or chloride of zinc, or both chlorides, gradually during the fusing of the charge of chloride of lead in the crucible F. The proportion of chloride of cadmium and of chloride of zinc or of metallic zinc to the charge of chloride of lead will in each case depend upon the degree of porosity desired in the finished plate, and therefore by simply varying the proportions of the salts of the metals added or combined with the charge of chloride of lead will the degree of porosity be increased or diminished in the finished plate, as well as the strength thereof.

When chloride of cadmium and chloride of zinc or metallic zinc are added to a charge of chloride of lead, the plates ultimately produced therefrom possess great strength, and the fractures thereof offer a clean, bright, and uniform surface.

The simple addition of chloride of cadmium to the charge of chloride of lead enables me to obtain a crystallized plate which is not hygroscopic, and this is a very necessary condition, especially when it is desired to form a frame around the plate for using such plates as the elements of an electrical accumulator or secondary battery.

When either metallic zinc or chloride of zinc alone has been added to the charge of chloride of lead, the plate, after crystallization has taken place, will be more or less hygroscopic, yet not to an extent to impair the ultimate utility of the plate after reduction to a metallic condition, especially if a maximum degree of porosity is not desired, while, on the other hand, if the chloride of cadmium, which of itself is not deliquescent, be added to the mass or compound excellent results are obtained.

Metallic zinc is of a less deliquescent nature than the chloride of zinc and less expensive, and good results are obtainable by using it in combination with the salt of another metal. The chloride of zinc, while more deliquescent than metallic zinc, may be used by my method of treatment and a crystallized metal plate obtained with the desired degree of porosity and strength without the admixture or combination of a third chloride with the mass in the production of a plate.

While I have mentioned chloride of lead as the principal salt for the production of a crystallized metallic plate, still I do not wish to be understood as limiting myself to using that salt in conjunction with other salts of the metals, for my improved method is applicable to the treatment of the salt of any metal having combined therewith other salts of the metals or a metal or metals for the production of a crystallized metallic plate or structure with porosity. The charge of chloride of lead with a varying quantity or percentage of a salt or salts of another metal or metals, or a metal, or both, combined therewith having been subjected to fusion in the crucible F, and having arrived at a molten state, the crucible is tilted by means of the lever $f^2$, and the sliding door I at the same time raised sufficiently to permit of the discharge of the contents into a mold M through the mouth m thereof, and in a few minutes thereafter in the cooling off of the mass or compound therein crystallization takes place.

The selection of proper material for the mold M is of some importance, and the interior surface should be perfectly smooth. The mold to which preference is given is one made of either brass or bronze and composed of two symmetrical sections $m'$ and $m^2$, chamfered, as shown in Fig. 4, the two sections being united to each other by means of a hinge $m^3$ and held firmly together by means of catches $m^4$, secured to the extremities of the shaft $m^5$, held in bearings $m^6$, formed with one of the sections and operated by a lever $m^7$, as shown in Figs. 2 and 3. The two sections constituting the mold in which crystallization takes place may be formed so that each will be of a uniform thickness of metal and the thickness of each section varying from two to five millimeters, according to the dimensions of the crystallized plate to be obtained.

In the pouring of a fused mass or compound into a mold in which the two parts thereof are of equal thicknesses of metal such mass will commence to cool from each side, and the crystals composing said mass will meet or unite with each other at their summits, sides, or facets, forming columns with geometrical regularity uniformly throughout the mass solidifying—that is, the crystals assuming such geometrical regularity in parallel columns to each other from one side of the mold will meet or unite with the crystals forming like columns with similar regularity from the opposite side of the mold at the median line of the crystallized structure. When a mold is used having the two parts or sides of unequal thicknesses of metal, the fused mass charged into the mold will cool therein unequally, thereby causing the individual crystals (while forming with geometrical regularity in parallel columns) to assume a fixed position in the structure faster from the side of the mold having the greater thickness of metal than the crystals assuming a fixed position in the plate from the opposite side of the mold, of a less thickness of metal—that is, the crystals from one side of the mold will meet or unite with each other, forming columns with those meeting or uniting with each other and forming columns from the opposite side of the mold, and these columns of crystals thus formed will unite with each other from both sides of the mold beyond the median line of the plate or structure. In the formation of plates from a fluid mass in molds having the sides of equal thicknesses of metal such plates, when reduced to a metallic state, will be brought to a state or condition with a maximum degree of porosity and strength, thereby rendering them especially applicable for use as the electrodes of secondary or storage batteries.

When the crystallized structure or plate in the mold M has become cool, the sections $m'$ and $m^2$ of said mold are unclamped and the plate removed into another mold N for casting around said crystallized plate a frame of lead or other suitable material. The framing-mold N consists of two sections $n$ and $n'$, made of cast-iron or other suitable material. The section $n$ of this mold has an upper rim $n^2$, and when in the form of a parallelopipedon a beveled rim $n^3$ is formed around the interior sides near the bottom thereof, and with a funnel-shaped neck $n^4$ for the introduction of the material into the mold when the two sections $n$ and $n'$ of the mold are clamped together in any suitable manner. The sides of the section $n'$ of the mold are deflected downward, with a series of grooves $n^5$ provided in the under edges, which form air or vent holes when the two sections are clamped together. Two or more small openings $n^6$ are formed in the section $n'$ for the introduction of small pins for holding the crystallized plate in proper position in the mold, in order that lead or other suitable material may be cast uniformly around said plate in the form, preferably, of a beveled frame with a conductor $n^7$. The crystallized plate framed in the manner described may then be removed from the mold N and one of the faces thereof coated with paraffine, wax, or other suitable material and then mounted, as illustrated in Fig. 6, in a vase G, containing a solution of any chloride and water—preferably sal-ammoniac—in the proportion of ten to fifteen per cent., (more or less,) in contact with plates of equal dimensions of metallic zinc, iron, nickel, cobalt, cadmium, vanadium, or other material or metal plates. It is best in each instance to select metal plates for contact with the crystallized plates which will have a greater affinity for the foreign elements contained in the crystallized plates than the latter plates have for them, and, furthermore, that the solution in which the two series of plates are immersed in the vase G should be composed of a salt or chloride belonging to the same family or class as the salt or chloride of which the crystallized plates are mainly composed, because better results may be obtained.

A series of the crystallized plates 2, with one of the faces of each coated with paraffine, wax, or other analogous material, is mounted in a vase G, containing a solution in contact with a series of plates 3 of equal dimension, and composed of metallic zinc, iron, nickel, cobalt, or other metals or material, the two series of plates in direct contact with each other being mounted in the vase G so that there will be no play therein. The chemical process of reduction, taking from twelve to fifteen hours, will cause said crystallized plates to arrive at a metallic state or condition, while at the same time all foreign elements not forming a component part of the metal required will be eliminated. The foreign elements eliminated from the crystallized plates in the chemical action taking place will combine with the solution or bath in the vase G and form part thereof. The crystallized plates reduced to a metallic state in the manner described may then be removed from the vase G and thoroughly washed and dried. The crystallized plates treated in this manner will be found to possess the requisite strength and have the degree of porosity desired.

In Fig. 7 I have shown another mode of reducing the crystallized plates to a metallic state or condition. 2 represents a series of crystallized plates alternately in direct contact with a series of metallic plates 3, composed of zinc, iron, nickel, cobalt, or other material, and mounted firmly in a vase G, containing a suitable solution. In the chemical action which takes place therein the series of crystallized plates will be readily reduced to a metallic state with the elimination in the operation of all elements foreign to or not forming a component part of the crystallized metal plates or structures required.

The difference between the method illustrated in Fig. 6 and that illustrated in Fig. 7 is simply that instead of coating one face of each crystallized plate with paraffine, wax, or other suitable material one face of each metallic plate is coated with such material, the coated metallic plates of equal dimension with the uncoated crystallized plates being then immersed in a suitable solution in the vase G, so that the plates will have no play while mounted therein, because if such were allowed either laterally or otherwise in the vase G during the chemical action taking place there would be a decided tendency for the crystallized plates to bulge, warp, or crack, and hence impair their utility for subsequent use. By coating one of the faces of the crystallized plates or the metal plates in contact therewith the crystallization of the plates or other structures is preserved in columns while reducing the plates to a metallic state. If, on the other hand, neither face of the crystallized plates was coated with paraffine, wax, or other analogous material in the chemical action taking place in direct contact with metallic plates having a greater affinity for foreign elements or extraneous matters contained in the crystallized plates than the latter plates have for such elements, the tendency would be to cause the crystallized plates to swell out or bulge in the reduction step of the process and to produce an actual cleavage at the line of cleavage; but this is entirely obviated by my method of treatment hereinabove described, by which crystallized plates are produced having great strength, and in which the cells extend entirely through from one face to the other of the plate. The paraffine, wax, or other analogous material that the plates are partially coated with will be detached by the chemical action taking place in the reduction of the crystallized plates, causing the same to combine with the solution to a greater or less extent, while, on the other hand, if not entirely detached or removed by the chemical action into the solution, such as may remain on the respective faces of the plates may be readily scaled or scraped off in any suitable manner after the removal of said plates from the vase G.

The crystallized chloride or other plates may be reduced more quickly to a metallic state by an electric current, if so desired—for example, by mounting a series of the crystallized plates in an electrolytic bath in a vase properly insulated from a series of metal or other plates of equal dimension composed of zinc, cadmium, iron, cobalt, nickel, or other material, such as charcoal.

The two systems of plates having been properly insulated from each other and from the vase, and mounted therein so that play laterally or otherwise will not take place, are then connected by wires with the positive and negative electrodes, respectively, of a dynamo—that is to say, the positive electrode being connected with the system of metal plates and the negative electrode with the system of crystallized plates—and in the ensuing electrolysis which is permitted to take place the crystallized plates will be reduced to a metallic state.

Having thus described the nature and objects of my invention, what I claim as new, and desire to secure by Letters Patent, is—

1. The method of producing a porous crystallized metal plate, which consists in subjecting metallic salts to fusion, then pouring the mass into a mold and allowing it to crystallize therein, and then coating one of the faces of the cast crystallized plate with a non-conducting substance and reducing to a metallic state in a solution in contact with metal plates, substantially as and for the purposes set forth.

2. The method of producing a porous crystallized metal plate, which consists in subjecting metallic salts to fusion, then pouring the mass into a mold and allowing it to cool and crystallize therein, then partially coating the cast crystallized plate with a non-conducting substance and reducing electrolytically to a metallic state, and then washing and drying said plate, substantially as and for the purposes set forth.

In witness whereof I have hereunto set my signature in the presence of two subscribing witnesses.

CLÉMENT PAYEN.

Witnesses:
 CHAS. HART,
 HERMANN BORMANN.